US008182549B2

(12) United States Patent
Naccache

(10) Patent No.: US 8,182,549 B2
(45) Date of Patent: May 22, 2012

(54) TERMINAL THEFT PROTECTION PROCESS, AND CORRESPONDING SYSTEM, TERMINAL AND COMPUTER PROGRAM

(75) Inventor: David Naccache, Paris (FR)

(73) Assignee: Compagnie Industrielle et Financiere d'Ingenierie "Ingencio", Neuilly-sur-Seine (FR)

( * ) Notice: Subject to any disclaimer, the term of this patent is extended or adjusted under 35 U.S.C. 154(b) by 621 days.

(21) Appl. No.: 12/328,944

(22) Filed: Dec. 5, 2008

(65) Prior Publication Data

US 2009/0151010 A1 Jun. 11, 2009

(30) Foreign Application Priority Data

Dec. 7, 2007 (FR) ..................................... 07 59656

(51) Int. Cl.
*G06F 11/00* (2006.01)
*G06F 17/30* (2006.01)

(52) U.S. Cl. ............................... 726/35; 726/34; 726/26

(58) Field of Classification Search ..................... 726/35
See application file for complete search history.

(56) References Cited

U.S. PATENT DOCUMENTS

2004/0123125 A1* 6/2004 Zuili ............................ 713/193
2004/0167820 A1 8/2004 Melick et al. ................... 705/16
2009/0106824 A1* 4/2009 Morel et al. ...................... 726/4
2009/0222659 A1* 9/2009 Miyabayashi et al. ........ 713/156
2010/0185953 A1* 7/2010 Grandemenge ................... 726/1

FOREIGN PATENT DOCUMENTS

WO WO 00/52658 9/2000
WO WO 2004/109613 12/2004
WO WO 2006/079520 8/2006

OTHER PUBLICATIONS

French Search Report from counterpart foreign application No. FR 07/59656.

* cited by examiner

*Primary Examiner* — David Y Jung
(74) *Attorney, Agent, or Firm* — David D. Brush; Westman, Champlin & Kelly, P.A.

(57) ABSTRACT

A process is provided for protection against theft of electronic payment terminals utilized in a group including at least two electronic payment terminals organized as a network. The process includes the following steps: mutual detection of the presence of each of the terminals of the group; and transmission of absence information if at least one of the terminals is not detected.

14 Claims, 5 Drawing Sheets

50

| Terminal identifier | Terminal status | Last message received |
|---|---|---|
| T1 | Present | H1 |
| T2 | Present | H2 |
| T3 | Defective | H3 |
| ... | Absent | ... |

50

| Terminal identifier | Terminal status | Last message received |
|---|---|---|
| T1 | Present | H1 |
| T2 | Present | H2 |
| T3 | Defective | H3 |
| ... | Absent | ... |

TERMINAL THEFT PROTECTION PROCESS, AND CORRESPONDING SYSTEM, TERMINAL AND COMPUTER PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of electronic payment terminals, and more specifically portable or mobile payment terminals utilized as a group, or in a group, at the same site.

More specifically, the disclosure relates to protection against theft of such terminals.

BACKGROUND OF THE DISCLOSURE

It is possible to find electronic payment terminals utilized as a group or forming a "community" in supermarkets, for example at each of the check-outs, or in restaurants.

In this case, the number of terminals, and their size, making it difficult to monitor them (by human means, for example, or video surveillance means), it is preferable to have stationary terminals, i.e. connected to a base, which are therefore difficult to steal.

However, because they are easier to use, mobile or portable terminals are often utilized, in particular in restaurants so that the client does not have to move when paying by bank card.

A disadvantage of these mobile terminals is that they are easily accessible and therefore at risk of theft.

SUMMARY

An aspect of the disclosure relates to a process for protection against theft of electronic payment terminals utilized in a group comprising at least two electronic payment terminals organized as a network, including the following steps:

- mutual detection of the presence of each of said terminals of said group;
- transmission of absence information if at least one of said terminals is not detected.

Thus, an aspect of the disclosure is based on a novel and inventive approach of protection against theft of terminals, which uses the terminals themselves to detect any absence of one or more of the terminals of the same group, or to mutually check on the presence of each of the terminals of the group. If the absence of a terminal is detected, the process according to an aspect of the disclosure involves the transmission of absence information, enabling the appropriate actions to be implemented, for example a verification (by human control means or by a video surveillance system, etc.) of the absence of a terminal, at the site where the group of terminals is used, or a direct call to a person responsible for the safety of the group of terminals.

Thus, in a group of terminals organized as a network, the terminals, aside from processing payment transactions conventionally performed by such a terminal, are also responsible for monitoring other terminals, so as to detect a possible absence among them.

According to a specific feature of the disclosure, said detection step includes, for at least one of said terminals of said group, the following sub-steps:

- transmitting at least one first request to check on the presence of at least one other terminal of said group, called the terminal to be detected, to said terminal to be detected;
- waiting for at least one response to said request, from said terminal to be detected;
- transmitting an alert of a potential detected absence of said terminal to be detected if there is no response or an invalid response by said terminal to be detected.

Thus, the mutual detection step, implemented for at least one of the terminals of the group, includes sub-steps making it possible to check on the presence of at least one other terminal, called the terminal to be detected, and transmitting an alert of a potential absence, to other terminals, if the absence of a terminal is detected.

The absence of a terminal is detected if the terminal does not respond, or if it responds incorrectly, before a certain period, to a first presence checking request, transmitted by at least one terminal of the group. This time period can be predetermined on the basis of criteria such as the time of transmission of messages over the network, or the assumed level of activity of the terminals in the processing of transactions.

In particular, said potential absence alert is sent to all of the terminals of said group, so that each of them implements a step of verifying the absence of said terminal to be detected.

Thus, the process according to an exemplary aspect of the disclosure involves a step of verifying the potential absence of the terminal to be detected, so as to limit the incorrect and unverified absence detections. Indeed, the absence of a terminal can be detected when the terminal is simply unavailable (for example busy processing a transaction, or during start-up, etc.). In this case, it is important not to generate an absent terminal alert.

This potential absence alert is transmitted to each of the terminals of the group, so that each of the terminals implements a verification of the potential absence of the terminal to be detected and all of the means are used to confirm or deny the absence of the terminal, and so that each of the terminals of the group is informed of a possible absence of another terminal of the group.

According to a specific embodiment of the disclosure, said absence verification step includes the following sub-steps:

- transmitting at least one second request to check on the presence of said terminal to be detected to the latter;
- waiting for at least one response from said terminal to be detected;
- transmitting:
- information confirming the absence of said terminal to be detected, if there is no response or an invalid response by the latter; or
- alert cancellation information if the terminal to be detected provides a valid response.

Thus, the process according to an aspect of the disclosure makes it possible to confirm or deny a detection of a potential absence of a terminal, by calling it again by means of a second presence check request. Again, a valid response by the terminal to be detected is awaited, so as to check on its presence and deny its potential absence. In this case, alert cancellation information is transmitted so that the procedure implemented in the event of a terminal theft is not carried out. However, if there is no response, or if there is an invalid response by the queried terminal, the potential absence is confirmed by the transmission of confirmed absence information.

According to a specific aspect of the disclosure, said mutual detection step includes a decision step providing validated information on the absence of said terminal to be detected when no cancellation information has been received.

Thus, when, at the end of the verification step, no cancellation information has been transmitted, the terminal to be detected is considered by the terminals of the group not to be present in the group.

According to alternative embodiments, the case in which a single cancellation information item has been transmitted, or the case in which a plurality of cancellation information items and a plurality of information items confirming an absence have been transmitted can be processed differently. It is possible, for example, to consider either implementing this verification step a second time, or having the alert systematically cancelled if at least one alert cancellation information item has been received.

According to a specific embodiment, the process includes a step of transmitting said validated information on the absence of said terminal to be detected to at least one entity managing said terminals of said group.

Thus, if the group of terminals is managed by an entity, which may or may not be distinct from these terminals, for example a management server, this entity is informed only when the absence of a terminal of the group that it manages is confirmed and validated. The management entity can then act consequently.

According to a specific aspect, said responses and/or said information include at least one information item for identifying said terminal to be detected.

Thus, the messages associated with the terminal to be detected can easily be identified by the terminals of the group, owing to this identification information or identifier. In this way, the status of each terminal can easily be monitored by each of the terminals of the group.

According to a specific embodiment, the process includes, prior to said mutual detection step, a step of associating at least one terminal to be detected with each of said terminals of said network.

Thus, a terminal of the group is responsible for checking on the presence of at least one of the other terminals of the group. For example, when the group is installed, or when the terminals are turned on, or regularly during operation of the group, the entity managing the terminals of the group associates one terminal with another terminal to be checked on.

According to a first alternative, this association can be determined for all of the mutual detection steps implemented by the terminals.

According to a second alternative, this association can be random, and different in each implementation of the process according to an aspect of the disclosure.

According to another specific embodiment, the process includes, prior to said mutual detection step, the following sub-steps:

- receiving all of the messages transmitted by each of the terminals of said group;
- updating a presence list based on the messages received.

Thus, each terminal of the group is on watch for the other terminals, and is responsible for monitoring the presence of the other terminals. For example, each of the terminals manages a presence list enabling the status of the other terminals of the group to be known. This presence list can in particular include information identifying other terminals of the group, and information concerning the messages received by the other terminals of the group, for example a timestamp of the last message received for each terminal, and so on.

This presence list can be updated on the basis of the messages received, and thus enable the status of the other terminals to be known, for example on the basis of the time of the last message received with respect to the current time when the list is updated.

In particular, said step of transmitting a first presence check request is implemented on the basis of an analysis of said presence list.

For example, if a terminal has not received a message from another terminal of the group since a predetermined time, it can consider the latter to be potentially absent from the group, and transmit a first presence check request, so as to initiate the mutual detection step of the process.

According to another aspect of the disclosure, the process includes a step of self-detection of theft of one of said terminals of said network, called an isolated terminal, when it does not receive any message from the other terminals of said group.

Thus, the process according to an aspect of the disclosure not only enables the terminals of a group to detect the presence or absence of the other terminals of the same group, but it also enables a terminal to detect whether it is itself absent from the group. Indeed, when a terminal manages a presence list as described above, it can assume that it is itself absent from the group if it is no longer receiving any messages from any other terminal after a certain time period. Similarly, when a terminal is responsible for monitoring one or more other terminals, if it does not receive any response to the check requests transmitted, it can self-detect that it is the one absent from the group.

In particular, said step of self-detection includes a step of protecting and/or suppressing data from said isolated terminal.

Thus, when a terminal has detected that it is absent from the group, and therefore isolated and potentially stolen, it implements actions to protect its data, so as to make itself unusable. For example, it can make access to certain protected data impossible, or, more radically, suppress all or some of its data.

Moreover, said self-detection step includes a step of transmitting an alarm message to each of said terminals of said group and/or said group management entity.

Thus, an isolated terminal can inform the other terminals of the group, or the group management entity, by transmitting an alarm message. In this way, the protection actions can then also be implemented by the management entity or one of the other terminals of the group. The process according to an aspect of the disclosure can also involve increasing the transmission power of the terminal if such an alarm message is transmitted. Indeed, the isolated terminal may be located at a distance from the group and incapable of transmitting messages to the terminals of the group, if it does not increase its transmission power.

According to a specific embodiment, the process includes a step of transmitting a warning message by a defective terminal, so as to avoid the generation of unnecessary alarms.

Thus, a terminal aware of an internal defect (a battery problem, a battery almost discharged or below a predetermined threshold, etc.) can inform the other terminals of the group and/or the group management entity, so as to avoid being detected as absent from the group due to a non-response or an incorrect response to the check requests. In this way, this terminal is considered by the other terminals of the group and/or the group management entity to be defective, and is no longer called to check its presence. This solution makes it possible to avoid the unnecessary generation of alarms for an absent terminal when said terminal is defective but present in the group.

The disclosure also relates to a system for protection against theft of electronic payment terminals utilized in a group comprising at least two electronic payment terminals organized as a network, including means for mutual detection (e.g., a detector) of the presence of each of said terminals of said group and means for transmitting (e.g., a transmitter) absence information if at least one of said terminals is not detected.

Such a system is capable of implementing the process for protection against terminal theft described above.

Another aspect of the disclosure relates to an electronic terminal intended to be utilized in a group comprising at least two electronic payment terminals organized as a network, including means for checking (e.g., a detector) on the presence of at least one other terminal of said group and means for transmitting (e.g. a transmitter) absence information if at least one of said terminals is not detected.

In particular, such a terminal includes:

- means for transmitting (e.g., a transmitter) at least one first request to check the presence of at least one other terminal of said group, called the terminal to be detected, to said terminal to be detected;
- means for waiting (e.g., a detector) for at least one response to said request, from said terminal to be detected;
- means for transmitting (e.g., a transmitter) an alert of a potential detected absence of said terminal to be detected if there is no response or an invalid response by said terminal to be detected.

In addition, such a terminal includes means for self-detection (e.g., a detector) of theft when it does not receive any message from the other terminals of said group.

Such a terminal is in particular suitable for implementing the terminal theft protection process described above.

Finally, the disclosure relates to a computer program that can be downloaded from a communication network and/or stored on a computer-readable medium and/or run by a processor, including program code instructions for implementing the terminal theft protection process described above.

BRIEF DESCRIPTION OF THE DRAWINGS

Other features and advantages will become clearer on reading the following description of a specific embodiment, provided as a simple illustrative and non-limiting example, and appended drawings, in which.

DETAILED DESCRIPTION OF ILLUSTRATIVE EMBODIMENTS

1. General Principle

The general principle of an aspect of the disclosure is based on the use of electronic payment terminals themselves in order to detect the presence, and consequently the possible absence, of other terminals in the same group. This mutual presence detection is made possible in particular by a dialogue between the terminals of the same group, organized as a network, for example managed by an entity called the network manager, or the group manager.

When these payment terminals are not in the transaction phase, i.e. when they are not busy processing a transaction, they are used to detect the presence or the absence of the other terminals of the group.

Thus, if one or more terminals of the same group are stolen, the other terminals of the same group are capable of detecting the absence of the terminal(s) stolen, then making it possible to implement appropriate actions in the event of terminal theft (deactivation of the terminal(s) stolen, for example). These actions are initiated, for example, by the group manager when it is informed of the detected and confirmed absence of one or more terminal(s) of the group.

2. Examples of Groups of Terminals for Implementing the Process According to an Aspect of the Disclosure Below, we will consider two examples of a group of terminals, shown in FIGS. 1*a* and 1*b*, for implementing the process according to two specific embodiments of the disclosure.

In these two examples, we will consider a group 10 of four electronic payment terminals (T1, T2, T3 and T4) utilized in a restaurant.

Figure 1A:
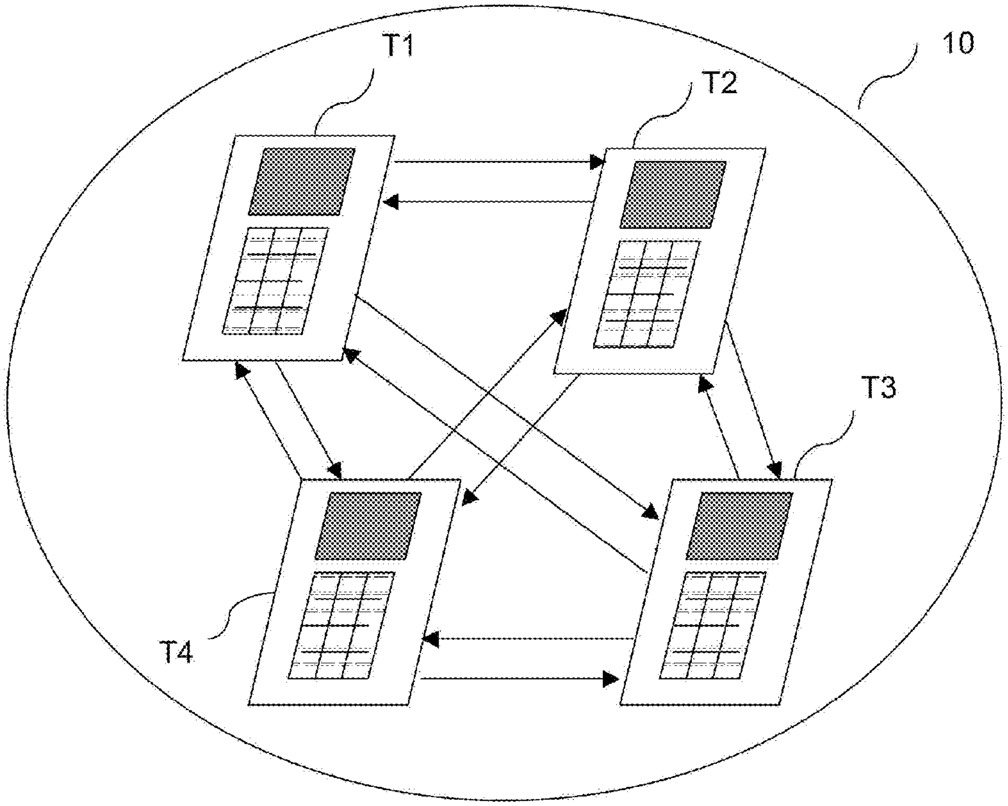
FIGS. 1*a* and 1*b* show two examples of a group of electronic payment terminals organized as a network for implementing the theft protection process according to two embodiments of the disclosure.

In the first example, in reference to FIG. 1*a*, all of the terminals of the group 10 are on watch for the other terminals and are capable of detecting the absence of one or more terminal(s) of the group.

Figure 1B:
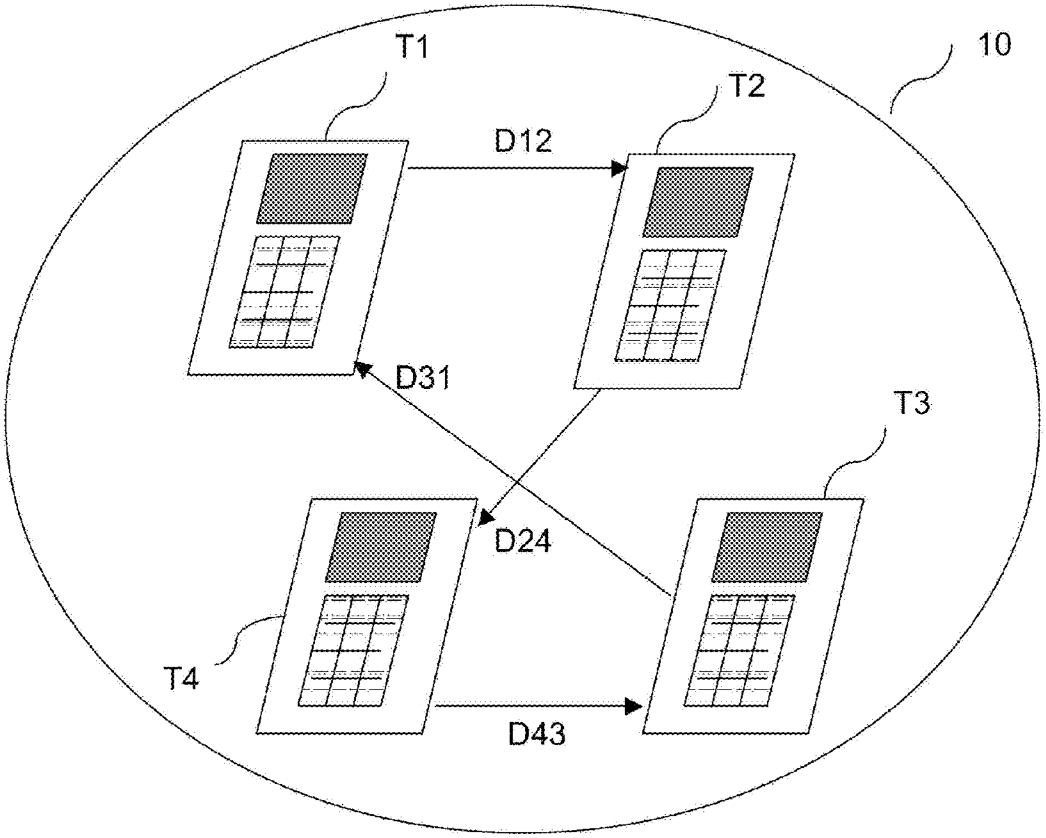

In the second example, shown in FIG. 1*b*, each terminal is used to detect the presence of another terminal of the group. This association between two terminals of the group, i.e. between a terminal responsible for detecting the presence of another terminal and that terminal, can be defined in various ways.

For example, when the terminals are installed in the restaurant, each terminal is responsible for checking the presence of another terminal in the group, assigned to it, for all of the implementations of the mutual detection process according to an aspect of the disclosure.

Thus, the group manager 10 assigns the terminals as follows:

- terminal T1 is used to detect the presence or the possible absence of terminal T2, as indicated by the connection designated as D12;
- terminal T2 is used to detect the presence or the possible absence of terminal T4, as indicated by the connection designated as D24;
- terminal T3 is used to detect the presence or the possible absence of terminal T1, as indicated by the connection designated as D31;
- terminal T4 is used to detect the presence or the possible absence of terminal T3, as indicated by the connection designated as D43;

Thus, each of the four terminals is responsible for detecting the presence of another of the terminals of the group, so that all of the terminals are "monitored", so that the absence of one or more terminal(s) can be detected.

In an alternative of this embodiment, it is possible to imagine that the mutual presence detection of the four terminals of the network is performed randomly. For example, the terminal group manager 10 can randomly assign each terminal to another terminal of the network of which it is to detect the presence. Thus, each terminal receives, from the group manager, identification information of the terminal of which it must detect the presence. This random assignment can also be renewed randomly, or in a predetermined manner, so that a terminal of the network is not always responsible for detecting the presence of the same terminal.

3. Description of a First Embodiment

Figure 2:
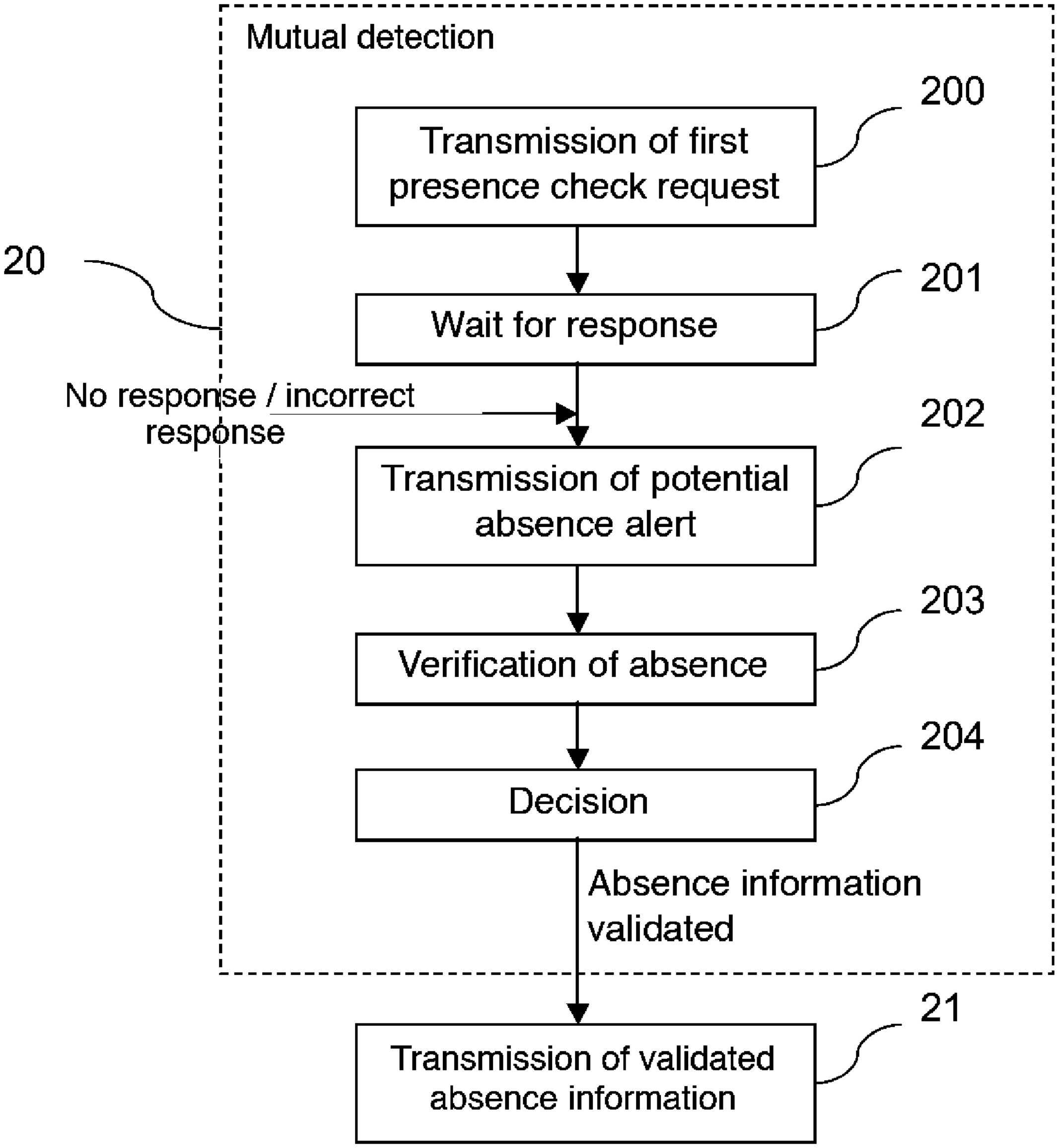
FIG. 2 shows the main steps of the process according to an aspect of the disclosure, implemented for a group of terminals as shown in FIG. 1*a* or 1*b;*

We will now describe, in reference to FIG. 2, the main steps of the process for one of the four terminals of the group shown in FIGS. 1*a* or 1*b*, for example terminal T1. The same steps of the process are implemented in parallel, or alternatively, for the other terminals T2, T3 and T4, according to their activity (processing a transaction or not).

In this case, we will consider T1 to be checking on the presence of terminal T2. Since terminal T1 is not busy processing a transaction, it can implement the steps necessary for detecting the presence of terminal T2.

Depending on whether the group with which T1 and T2 are associated is organized according to the example shown in FIG. 1*a* or that shown in FIG. 1*b*, the mutual detection steps (step 20) are the same.

However, the steps prior to this detection can be different.

For example, in the case of the network of FIG. 1*a*, and as described below in reference to FIGS. 4 and 5, terminal T1 is on watch for all of the other terminals of the network, and, after having detected the possible absence of terminal T2 (for example because it has not received a message from T2 for a certain time period), it implements the main steps of the process according to an aspect of the disclosure.

In the case of the network of FIG. 1*b*, with terminal T1 being assigned by the group manager to monitor the presence of terminal T2, terminal T1 regularly implements the steps of the process according to an aspect of the disclosure, so as to regularly verify the presence of terminal T2.

In addition, the case shown in FIG. 2 is the one in which terminal T2 is actually absent from the group.

In a first mutual detection step 20, the following sub-steps are implemented.

Terminal T1 transmits a first presence check request to terminal T2 in a sub-step 200.

This first presence check request can contain an indication making it possible to identify the transmitter of the request, in this case T1, so that the receiving terminal, in this case T2, can respond to it. This indication can be useful in particular in the second network example (FIG. 1*b*). In the first example, it is assumed that a response by T2 is sent to all of the terminals of the group, so that they can be informed of the presence of T2.

This first request can also contain an identification indication of the recipient, in this case T2, so that the latter can verify that the request is indeed intended for it.

These identification indications are secured and generated by cryptographic methods, known to a person skilled in the art and therefore not described in detail here.

Once the request has been transmitted, the terminal T1 waits 201 for a response from terminal T2, queried in the preceding step.

The time spent waiting for the response is predetermined and can take into account, for example, the assumed use of the terminals. Indeed, a terminal that spends on average 80% of its time processing transactions will take longer to respond to a presence check request than a terminal that spends only 50% of its time processing transactions. This waiting time can also be calculated on the basis of the message transmission time in the network.

At the end of the predetermined waiting period, various cases may arise:

- terminal T2 responds to terminal T1 positively (not shown in FIG. 2), according to the predetermined response format in order to indicate that it is indeed present in the network;
- terminal T2 does not respond to terminal T1, or replies with an incorrect response (shown in FIG. 2).

In the first case, terminal T1 considers terminal T2 to indeed be present in the network, since its presence check request of terminal T2 received a positive response.

In the second case, terminal T1 considers terminal T2 to be potentially absent from the network, and transmits a potential absence alert in a step 202, for verification of the absence of T2.

This potential absence alert T2 is transmitted by terminal T1 to all of the terminals of the network, in this case terminals T2, T3 and T4.

Thus, in a second phase, each terminal of the network is called upon to verify whether a terminal that has been determined to be potentially absent in a first phase is actually absent or not.

Indeed, it is possible that terminal T2, in our example, did not have the time to respond to the request, for example because it was busy processing a transaction. It is also possible that terminal T2 did not receive the request transmitted by terminal T1 due to communication problems within the terminal network. It is also possible that the response by T2 was not properly routed to T1. A verification of the absence of terminal T2 is therefore necessary so as to alert the network manager only in the event of a confirmed absence.

The process according to an aspect of the disclosure therefore includes a step 203 of verifying the absence, described in greater detail below in reference to FIGS. 3*a* and 3*b*, enabling the absence of terminal T2 to be confirmed or denied.

Once this absence verification step has been performed, a decision step 204 is implemented, in which validated information on the absence of terminal T2 is provided if the absence of T2 has been confirmed in the preceding step 203. This validated absence information is then transmitted, in a step 21, for example to the network manager. This network manager can be an entity distinct from the terminals of the group, or it can be one of the terminals. In this case, it can be a terminal pre-identified as the network manger, or the terminal at the origin of the transmission of the potential absence alert, i.e. in this example, terminal T1.

Figure 3A:
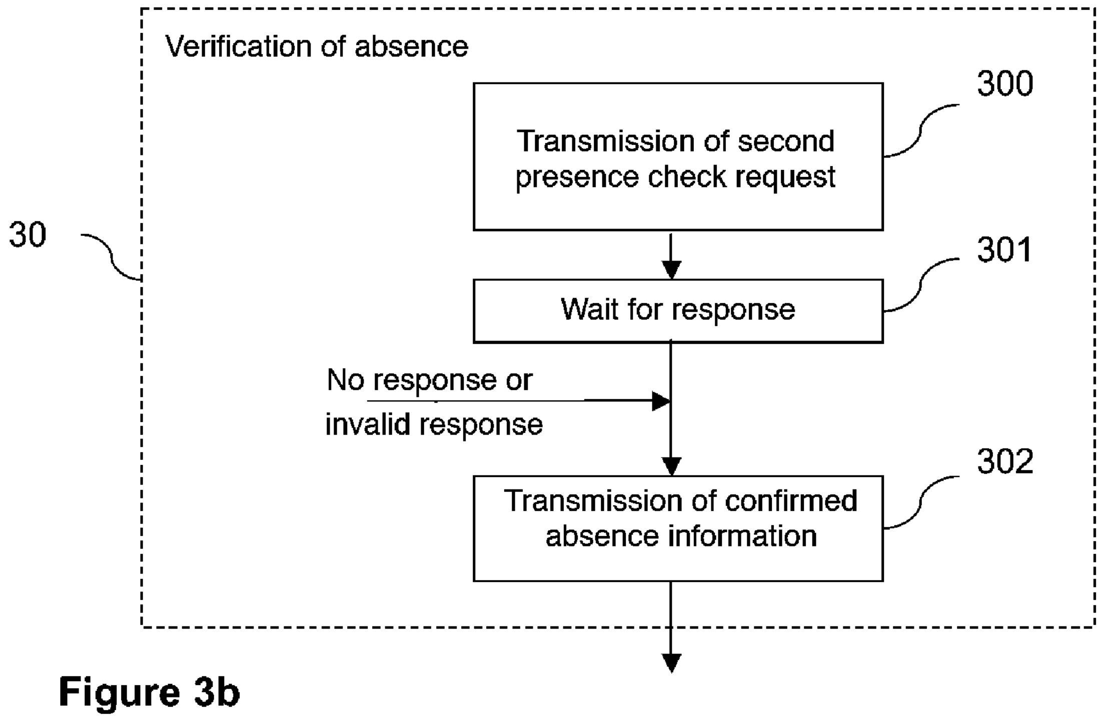
FIGS. 3*a* and 3*b* describe the main steps of the absence verification phase of the process according to an aspect of the disclosure, according to two specific cases.
Figure 3B:
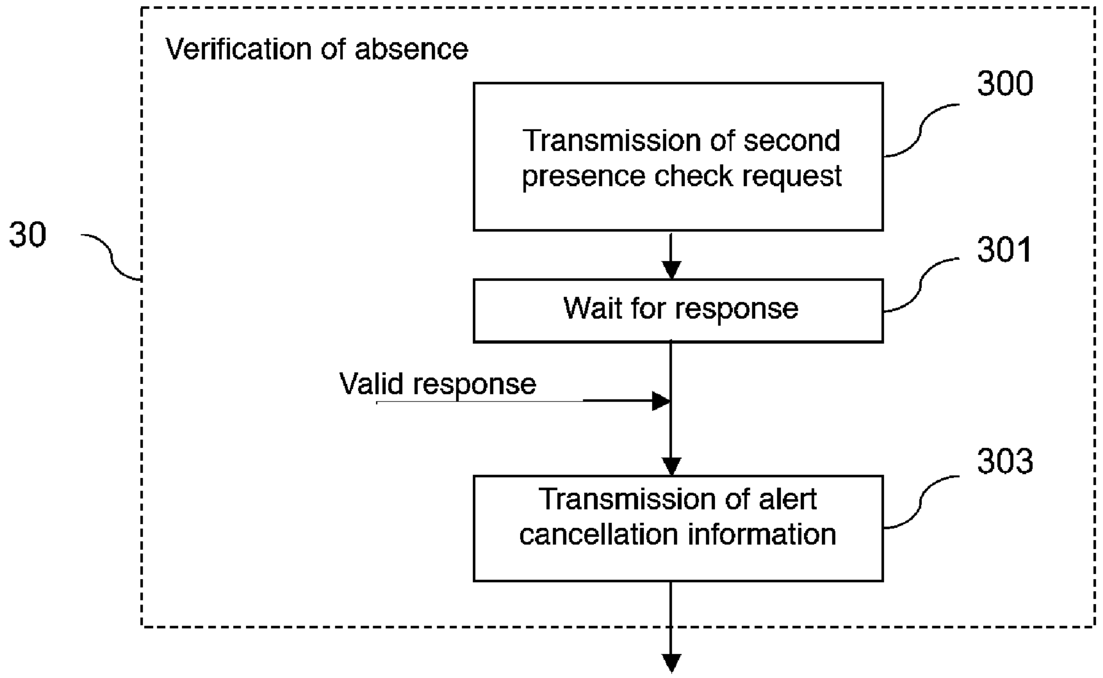

We will now describe, in reference to FIGS. 3*a* and 3*b*, the main sub-steps of the absence verification step (203, 30), if the absence of T2 is confirmed (FIG. 3*a*) and if the absence of T2 is denied (FIG. 3*b*).

After having received from terminal T1 an alert on the potential absence of T2, the terminals of the network therefore implement an absence verification step, including a sub-step 300 of transmitting a second presence control request. The terminals then wait 301 for a response from T2.

Again, the waiting time is predetermined and is dependent on parameters such as the frequency of use of terminal T2, for example, or the message transmission time in the network. To avoid a false absence confirmation, the waiting time in this absence verification step can be greater than the waiting time in the first detection step.

We will now consider, in this example shown in FIG. 3*a*, that terminal T2 has actually been stolen and is actually absent from the group of terminals.

Terminals T1, T3 and T4 receive an invalid response from terminal T2, or do not receive a response before the end of the waiting period. They thus consider the absence of terminal T2 to be confirmed, and transmit, in a step 302, a confirmed absence information item to the other terminals of the group.

In the case of the group of terminals shown in FIG. 1*a*, in which all of the terminals are responsible for monitoring the presence of the other terminals of the group, they are all capable of generating validated absence information and of then transmitting it to the group manager.

In the case of the group of terminals shown in FIG. 1*b*, in which terminal T1 alone is responsible for checking on the presence of terminal T2, it is the one that generates validated information on the absence of terminal T2, if it receives confirmed absence information from the other terminals of the group. According to alternative embodiments, it then transmits this validated absence information to the group manager, or itself implements the appropriate actions when the absence of a terminal is detected.

FIG. 3*b* shows the case in which terminal T2 is present in the group of terminals, even though it has not responded to the first presence check request transmitted in the mutual detection step (200). For example, it was busy processing a transaction, or it responded to this request but its response was not properly transmitted to the other terminals of the network, etc. Thus, after the second presence check request transmitted by the terminals of the network, terminal T2 responds validly, and its response is properly transmitted to terminals T1, T3 and T4. They then transmit, in step 303, alert cancellation information, denying the potential absence of terminal T2. This alert cancellation information makes it possible to determine that T2 is not absent from the group, and prevents the group manager from being alerted.

4. Description of a Second Embodiment

Figures 4, 5:
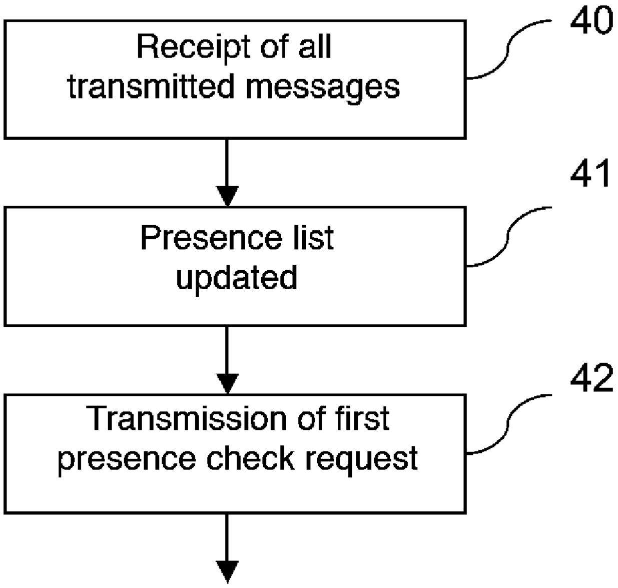
FIG. 4 shows the steps implemented prior to the mutual detection step according to a specific embodiment of the disclosure.
FIG. 5 shows an example of a presence list managed by a terminal according to an embodiment of the disclosure.

We will now describe, in reference to FIGS. 4 and 5, a second embodiment of the process according to another aspect of the disclosure, in the case of a group of terminals as shown in FIG. 1*a*.

In this example, all of the terminals are responsible for monitoring or checking on the presence of the other terminals of the group.

To do this, it is considered that each terminal is managing a presence list 50, as shown in FIG. 5, enabling it to know the status of each of the terminals of the group.

Thus, each terminal of the group is on watch for all of the messages transmitted by each of the other terminals and can therefore update the presence list on the basis of these messages. The information present in this list is, for example:

- an identifier of the terminal (for example a number associated with each terminal and included in each message transmitted in the network of terminals, making it possible to identify the terminal transmitting the message);
- terminal status information, indicating whether the terminal is present, absent or defective (for example with a low battery charge), etc;
- the timestamp of the last message received from said terminal, thus making it possible to determine whether the mutual detection step as described above must be implemented (for example, if the current time differs from the time of the last message by a time greater than a threshold, a check on the presence of the terminal must be performed, etc.).

FIG. 4 shows the main steps implemented by each terminal of the network, prior to the activation of the mutual detection step described above.

In a step 40, each terminal of the group is placed on watch for all messages transmitted over the network, and updates, in a step 41, its presence list, on the basis of the messages received.

This update of the presence list is also performed after a verification of the timestamp of the last message received by a terminal. Thus, each terminal verifies whether the last message received by the other terminals is recent, or if the difference between the current time and the time of the last message received does not exceed a threshold, in which case a check on the presence of the terminal in question would be necessary.

In this case, a first presence check request is transmitted in a step 42, thus initiating the mutual detection step as described in the paragraphs above.

5. Self-detection of theft

Another aspect of the terminal theft protection process concerns the self-detection by a terminal of theft.

Indeed, the principle of the process according to an aspect of the disclosure is based on the use of the capacities for dialogue between the terminals in order to detect a terminal that does not respond to the calls of the others. Consequently, a terminal present in the network and implementing the process according to an aspect of the disclosure is at a given time in communication with one or more terminals of the network, or, in the case of the group shown in FIG. 1*a*, is on watch for all messages transmitted by all of the terminals.

The self-detection of theft is based on the observation, by a terminal, of the fact that it does not come into communication with one or more terminals of the group.

Thus, in the case described above, in which a terminal manages a list of the presence of the other terminals of the network, a terminal observing that it has not received, for a certain time period, any message from the other terminals, can consider that all of the other terminals are absent from the group, or more likely, that it is itself no longer connected to the network.

Figure 6:
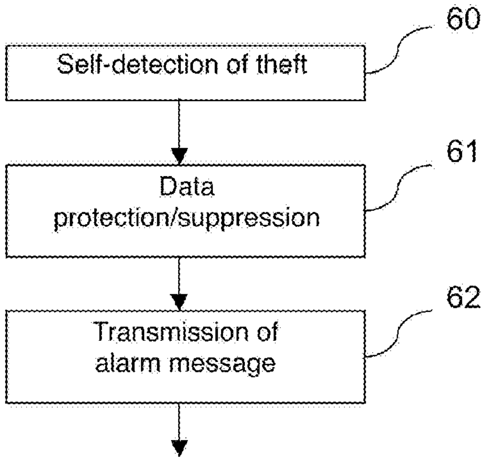
FIG. 6 shows steps implemented by a terminal that does not come into communication with one or more other terminals of the same network, according to an embodiment of the disclosure.

As shown in FIG. 6, in the process according to an aspect of the disclosure, a terminal that does not come into communication with one or more other terminals of the same network, after a predetermined time period, i.e. it does not receive any information from at least one other terminal, therefore considers itself to be isolated from said network, and potentially stolen.

This step 60 of self-detection of theft can then be followed by a step 61 of protecting/suppressing data of the isolated terminal, comprising for example of erasing the secured data stored in the memory, or of no longer allowing access to said data, thus making the isolated terminal unusable.

Moreover, the isolated terminal can also attempt to transmit an alarm message, in a step 62, to the other terminals of the group, if necessary by increasing its transmission power so as to increase the chances that its message will reach the other terminals of the group. Indeed, a stolen terminal may fairly quickly be at a significant distance from the group of terminals with which it was associated, and its transmission power in normal operation can be insufficient if it is far from the network.

At least one embodiment of the disclosure detects rapidly and in a simple manner the absence of a terminal in a group of terminals.

The embodiment thus provides a technique enabling terminals to be protected from theft, by detecting their absence.

Another aspect of the disclosure provides such a technique that is easy and inexpensive to implement.

Although the present disclosure has been described with reference to one or more examples, workers skilled in the art will recognize that changes may be made in form and detail without departing from the scope of the disclosure and/or the appended claims.

What is claimed is:

1. A process for protection against theft of electronic payment terminals utilized in a group comprising more than two electronic payment terminals organized as a network, wherein the process includes the following steps:

transmitting, by a first of said electronic payment terminals, at least one first request to check on the presence of at least one other terminal of said group, called a terminal to be detected, to said terminal to be detected;

waiting for at least one response to said first request, from said terminal to be detected;

broadcasting, to all the other terminals of said group, an alert of a potential detected absence of said terminal to be detected if there is no response or an invalid response by said terminal to be detected;

verifying the absence of said terminal to be detected, by each of said terminals that received said alert of absence, by transmitting to the terminal to be detected at least one second request to check on the presence of said terminal to be detected;

waiting for at least one response to the second request from said terminal to be detected; and transmitting, by each of said terminals that transmitted said second request:

information confirming the absence of said terminal to be detected, if there is no response or an invalid response to the second request the terminal to be detected; or alert cancellation information if the terminal to be detected provides a valid response, providing validated information on the absence of said terminal to be detected when no cancellation information has been received.

2. The process according to claim 1, wherein the process includes a step of transmitting said validated information on the absence of said terminal to be detected to at least one entity managing said terminals of said group.

3. The process according to claim 1, wherein at least one of said requests, said responses or said information include at least one information item for identifying said terminal to be detected.

4. The process according to claim 1, wherein the process includes, prior to transmitting said first request, a step of associating at least one terminal to be detected with each of said terminals of said network.

5. The process according to claim 1, wherein the process includes, prior to transmitting said first request, the following sub-steps:

receiving all of the messages transmitted by each of the terminals of said group;

updating a presence list based on the messages received.

6. The process according to claim 5, wherein said step of transmitting said first request is implemented on the basis of an analysis of said presence list.

7. The process according to claim 1, wherein the process includes a step of self-detection of theft of one of said terminals of said network, called an isolated terminal, when that terminal does not receive any message from the other terminals of said group.

8. The process according to claim 7, wherein said step of self-detection includes a step of performing at least one of protecting or suppressing data from said isolated terminal.

9. The process according to claim 7, wherein said self-detection step includes a step of transmitting an alarm message to at least one of each of said terminals of said group or a group management entity.

10. The process according to claim 1, wherein the process includes a step of transmitting a warning message by a defective terminal, so as to avoid generation of unnecessary alarms.

11. A system for protection against theft of electronic payment terminals utilized in a group including more than two electronic payment terminals organized as a network, wherein the system includes:

means for transmitting, by a first of said electronic payment terminals, at least one first request to check on the presence of at least one other terminal of said group, called a terminal to be detected, to said terminal to be detected;

means for waiting for at least one response to said first request, from said terminal to be detected;

means for broadcasting, to all the other terminals of said group, an alert of a potential detected absence of said terminal to be detected if there is no response or an invalid response by said terminal to be detected;

means for verifying the absence of said terminal to be detected, by each of said terminals that received said alert of absence, by transmitting to the terminal to be detected at least one second request to check on the presence of said terminal to be detected;

means for waiting for at least one response to the second request from said terminal to be detected; and means for transmitting, by each of said terminals that transmitted said second request:

information confirming the absence of said terminal to be detected, if there is no response or an invalid response to the second request the terminal to be detected; or alert cancellation information if the terminal to be detected provides a valid response, providing validated information on the absence of said terminal to be detected when no cancellation information has been received.

12. An electronic payment terminal intended to be utilized in a group including more than two electronic payment terminals organized as a network, wherein the terminal includes:

means for transmitting at least one first request to check on the presence of at least one other terminal of said group, called a terminal to be detected, to said terminal to be detected;

means for waiting for at least one response to said first request, from said terminal to be detected;

means for broadcasting, to all the other terminals of said group, an alert of a potential detected absence of said terminal to be detected if there is no response or an invalid response by said terminal to be detected; and means for receiving from said terminals that received said first request:

information confirming the absence of said terminal to be detected; or alert cancellation information.

13. The electronic payment terminal according to claim 12, wherein the terminal includes means for self-detection of theft when the terminal does not receive any message from the other terminals of said group.

14. A computer program stored on a non-transitory computer-readable medium and including program code instructions, which, when run by a processor, perform a process for protection against theft of electronic payment terminals utilized in a group comprising more than two electronic payment terminals organized as a network, wherein the process includes the following steps:

transmitting at least one first request to check on the presence of at least one other terminal of said group, called a terminal to be detected, to said terminal to be detected;

waiting for at least one response to said first request, from said terminal to be detected;

broadcasting, to all the other terminals of said group, an alert of a potential detected absence of said terminal to be detected if there is no response or an invalid response by said terminal to be detected; and receiving from said terminals that received said first request:

information confirming the absence of said terminal to be detected; or alert cancellation information.

* * * * *